F. GRAFF.
MACHINE FOR CUTTING MEAT INTO SLICES.
APPLICATION FILED MAY 6, 1908.

943,929.

Patented Dec. 21, 1909.
2 SHEETS—SHEET 1.

Witnesses:

Inventor:

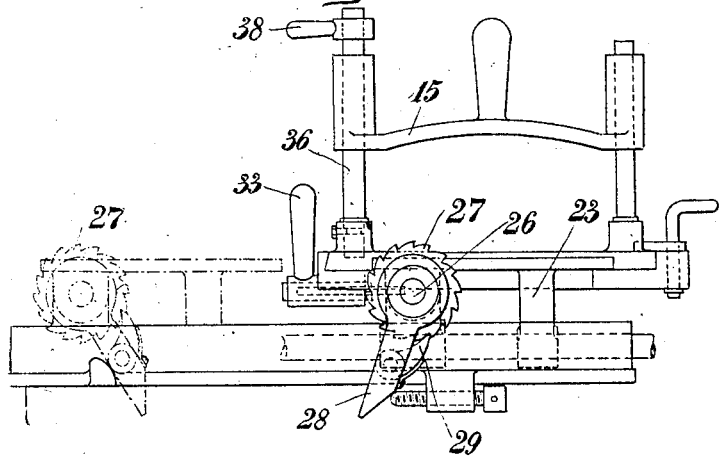
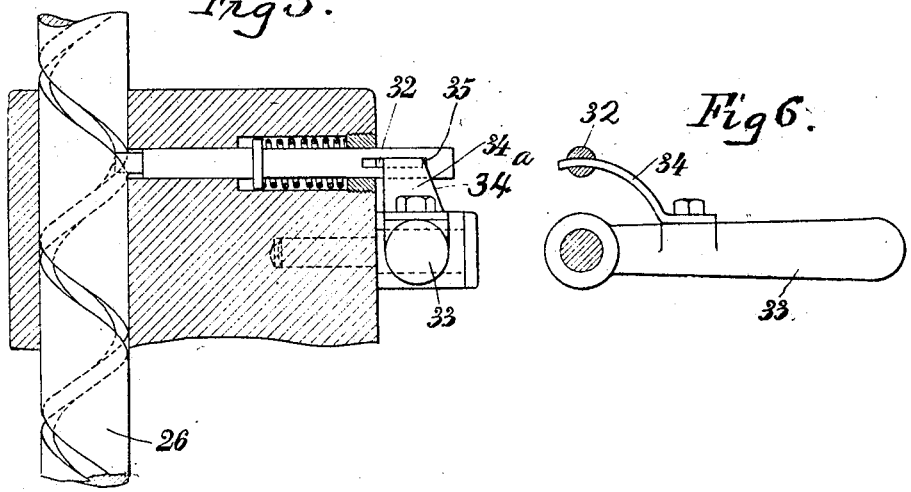

UNITED STATES PATENT OFFICE.

FRIEDRICH GRAFF, OF WITTEN, GERMANY.

MACHINE FOR CUTTING MEAT INTO SLICES.

943,929.

Specification of Letters Patent. Patented Dec. 21, 1909.

Application filed May 6, 1908. Serial No. 431,238.

*To all whom it may concern:*

Be it known that I, FRIEDRICH GRAFF, a citizen of the German Empire, residing at Witten-on-the-Ruhr, in the Province of Westphalia and Kingdom of Prussia, Germany, have invented certain new and useful Improvements in Machines for Cutting Meat into Slices; and I do hereby declare the following to be a full, clear, and exact description of the invention, such as will enable others skilled in the art to which it appertains to make and use the same.

Machines for cutting meat into slices are well-known *per se*. They are either provided with a plane knife which however, possesses the disadvantage that the soft meat adheres to the knife and so acts as a brake so that particularly on cutting somewhat larger pieces a great deal of power is requisite for driving the machine, or knives are employed with oblique cutting surfaces or with hollow cutting surfaces but not with the desired success. The meat even in these cases adheres firmly to the knife on account of suction and particularly in the case of soft meat it is impossible to obtain a proper cut. Further, in machines having a knife rotating in a horizontal plane the transfer of the meat on to the supporting plate presents difficulties because a gap in most cases is left between the knife and the supporting-plate. These defects are avoided in the case of the present invention by the knife at its edge being so curved in the form of a trough that the inner edge of said trough lies in one plane with the cutting edge so that any parts of meat which may be adhering by suction on the front edge of the knife are loosened by the hind edge of the trough. Consequently the knife comes into contact with the meat only at these two edges. In the case of machines having knives of this kind rotating in a horizontal plane there is also the advantage that the hind edge of the trough can be brought into the plane of a supporting plate and directly up to the latter so that the meat is transferred on to the supporting plate without being stopped by the knife. In order to facilitate the work the supporting plate is in the case of the machine hereinafter described displaceable in a horizontal plane in such a way that after each cut it returns automatically into the position from which it started.

The accompanying drawing illustrates by way of example, one form of machine according to the present invention with a rotating vertical knife.

Figure 1:
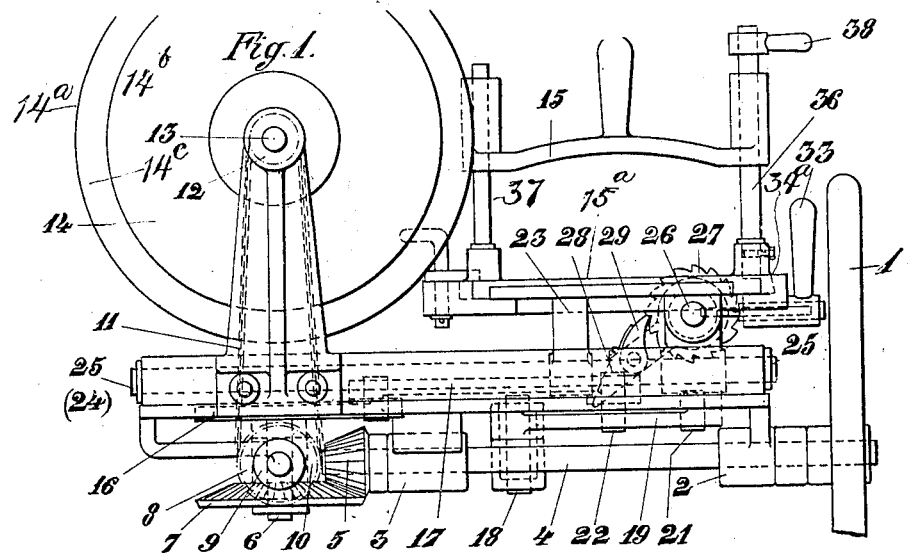
Figure 2:
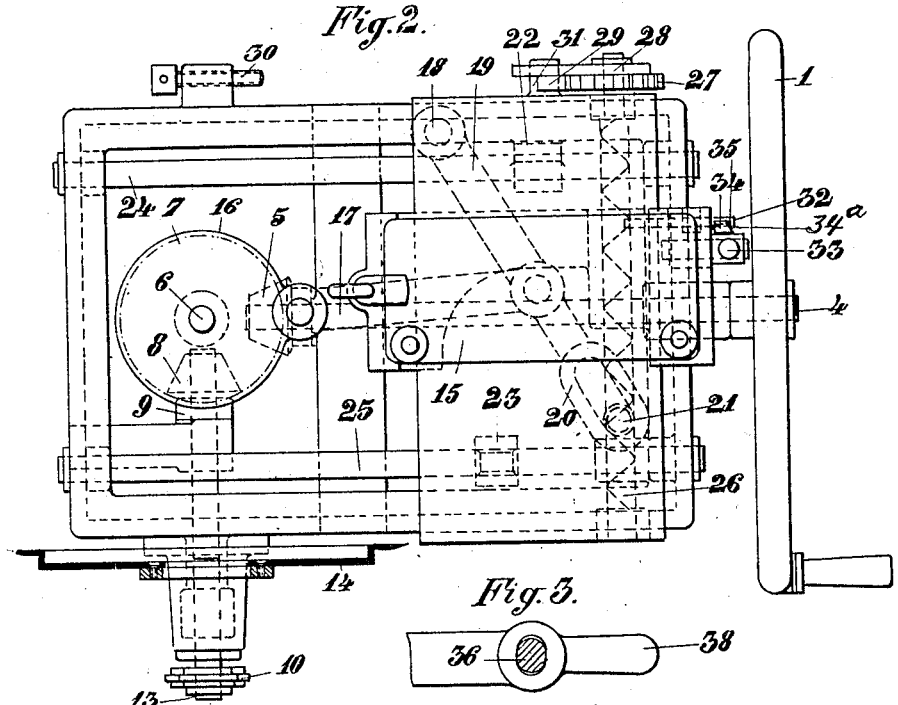
Figure 3:
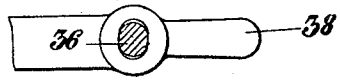

In said drawing: Figure 1 is an elevation of the machine, and Fig. 2 a plan, the knife being shown in section and some details being omitted for the sake of clearness. Fig. 3 represents a detail view, enlarged, of parts 36 and 38; Fig. 4 represents in side elevation enlarged a part of the machine, especially illustrating the meat clamping and feeding devices; Fig. 5 represents an enlarged detail view of the spindle 26, the slotted pin 32 and proximate parts; and Fig. 6 represents in enlarged detail view the parts 32, 33 and 34 hereinafter described.

The machine is driven by means of a crank-disk 1 for example, which is mounted on the main shaft 4 supported in bearings 2 and 3 under the table. The rotary motion of this shaft is transmitted by a bevel-wheel 5 on its inner end to the bevel-wheel 7 revoluble on the vertical shaft 6 having bearings in the machine frame or any fixed supports and is transmitted by said bevel-wheel 7 to the bevel-wheel 8. The latter wheel is mounted on the shaft 9 on which is fixed the chain-wheel 10 which transmits rotary motion to the chain-wheel 12 on the shaft 13 by means of a driving chain 11. The shaft 13 carries the disk-form knife 14, which has a trough 14ᶜ near or adjacent its edge. The cutting edge 14ᵃ of this knife is at the outer edge of said trough and the edge 14ᵇ for loosening the sliced meat is at the inner edge of said trough and in the same plane as the cutting edge. The operation and advantages of these parts have already been stated. This motion is produced by means of a crank-disk 16 arranged on the vertical shaft 6 and by means of a connecting-rod 17 pivoted thereto, which rod engages at its other end with a lever 19 pivoted at one end on the bolt 18 secured to the frame of the machine and provided at the other end with a longitudinal slot 20. In said slot there engages the pin 21 which is fixed on the table so that when the machine is driven the table alternately moves toward the knife and away from the latter, it being guided on the guide-rods 24, 25 by means of its eyes 22, 23 (see Fig. 2). The feed of the meat in the transverse direction, which feed determines the thickness of the slices, is effected automatically by means of a pawl and ratchet after each slice has been cut. For this purpose on that part of the clamping device which is not displaceable in the transverse direction a spindle 26 provided with a screw-thread is supported, which spindle carries a ratchet-wheel 27 at one of its ends (see Figs. 1 and 5). On the lever 28 which is adapted to turn through a part of a circle about the spindle 26 the spindle feeding pawl 29 is mounted, and turns said spindle with a step by step motion, being operated to that end by said lever. The extent of each forward movement of said spindle in such rotation depends on the amount of backward sweep allowed said lever, which may carry said pawl over one tooth or more than one, before beginning the forward feeding motion. Stops 30 and 31 at each end of the movement of said lever limit its movement, and the former stop, at least, is made adjustable to regulate the turning of said spindle at each impulse. As a disengageable resilient pin 32 which is supported in the slide adapted to move transversely engages with the thread of the spindle 26, the desired transverse motion of the meat is effected by these means. To permit returning the transversely movable slide into its original position the pin 32 can be disengaged from the thread of the spindle 26 by means of the handle 33 and the spring 34 (see Fig. 6), one edge 34ª of which spring is oblique and which is fixed on said handle and engages in a longitudinal slot 35 in the pin 32 (see Figs. 6 and 7). During the disengagement of said pin from the thread on the spindle the oblique edge 34ª of the spring 34 slides against the outer edge of the slot and so withdraws the pin. The meat is clamped simply by pushing down the bridge 15 which is guided on the rods 36, 37. One of these guide-rods, for example 36, is oval in section and is arranged revolubly on its support. By turning this rod by means of the handle 38 the bridge 15 is secured in position, the hole in the bridge through which the rod 36 passes being oval like said rod but having a somewhat larger cross-section. These rods, the bridge 15, and the base 15ª constitute collectively the meat-holding and feeding slide.

The hand-machine above described and illustrated in the drawings may of course be easily adapted to be driven by power.

Having now described my invention what I desire to secure by Letters Patent is:

1. A circular revoluble dished knife of a meat slicing machine, said circular knife having a trough adjacent its outer edge and a ridge at the inner edge of said trough.

2. A circular knife for meat slicing machines having a cutting edge and a circular ridge separated by a circular trough, said cutting edge being formed by the outer edge of said trough and said circular ridge forming the inner edge of said trough substantially as set forth.

3. A circular knife for meat cutting machines provided with cutting edge, and having a circular trough adjacent said cutting edge, and a circular ridge forming the inner edge of said trough and in the same plane with the cutting edge substantially as set forth.

4. A circular knife for meat slicing machines provided with a cutting edge, and having a circular trough adjacent said cutting edge and a circular ridge forming the inner edge of said trough, said cutting edge, trough and circular ridge being integral with said circular knife.

In testimony whereof, I have signed my name to this specification in the presence of two subscribing witnesses.

FRIEDRICH GRAFF. [L. S.]

Witnesses:
 OTTO KÖNIG,
 WILHELM FRIEDERICHS.